(12) United States Patent
Goto et al.

(10) Patent No.: US 6,721,151 B2
(45) Date of Patent: Apr. 13, 2004

(54) GROUND FAULT INTERRUPTER

(75) Inventors: Kiyoshi Goto, Itami (JP); Yoichi Kunimoto, Osaka (JP); Yoshihisa Ishigami, Tsu (JP)

(73) Assignee: Matsushita Electric Works, Ltd., Osaka (JP)

( * ) Notice: Subject to any disclaimer, the term of this patent is extended or adjusted under 35 U.S.C. 154(b) by 254 days.

(21) Appl. No.: 09/808,152

(22) Filed: Mar. 15, 2001

(65) Prior Publication Data

US 2001/0036048 A1 Nov. 1, 2001

(30) Foreign Application Priority Data

Mar. 15, 2000 (JP) ........................................ 2000-072992

(51) Int. Cl.[7] ................................................ H02H 3/00
(52) U.S. Cl. ........................................................ 361/42
(58) Field of Search ...................................... 361/42–50

(56) References Cited

U.S. PATENT DOCUMENTS 3,962,606 A * 6/1976 Burns et al. .................. 361/45
6,025,980 A * 2/2000 Morron et al. ............... 361/42

* cited by examiner

Primary Examiner—Ronald W. Leja
(74) Attorney, Agent, or Firm—Oblon, Spivak, McClelland, Maier & Neustadt, P.C.

(57) ABSTRACT

A ground fault interrupter including a zero-phase current transformer configured to detect unbalanced current flowing in electric lines. A switch is provided in the electric lines. A detection resistor is connected in parallel to the zero-phase current transformer and configured to convert current outputted from the zero-phase current transformer to voltage. A controller is configured to determine based on the voltage of the detection resistor whether an electric leak occurs and to open the switch when the controller determines that an electric leak occurs. At least one filter is provided between the detection resistor and the controller and is configured to remove high frequency elements in the voltage of the resistor. The at least one filter includes an input side resistor connected in series to the controller and configured to limit current input to the controller; and a capacitor connected in parallel to the controller.

8 Claims, 6 Drawing Sheets

GROUND FAULT INTERRUPTER

CROSS-REFERENCE TO RELATED APPLICATIONS

The present application claims priority to Japanese Patent Application No. 2000-072992, filed Mar. 15, 2000, entitled "Ground Fault Interrupter". The contents of that application are incorporated herein by reference in their entirety.

BACKGROUND OF THE INVENTION

1. Field of the Invention

The present invention relates to a ground fault interrupter.

2. Discussion of the Background

Due to the recent increase in use of inverter devices and development of high capacity inverter devices, the current leak caused by high frequency electric leak has increased. A conventional ground fault interrupter (B) includes a zero-phase current transformer 5, a resistor 6 for detection and an electric leak detection circuit 8 as shown in FIG. 4. The zero-phase current transformer 5 detects an unbalanced current flowing in electric lines 2, 2 between a grounded commercial electric source and a load. The resistor 6 is connected to the output side of the zero-phase current transformer 5 and converts a current flowing in the zero-phase current transformer 5 to a voltage signal. The electric leak detection circuit 8, functioning as an electric leak control unit, opens and closes switch 4 in the electric lines 2, 2 based on the voltage signal from the resistor 6. The electric leak detection circuit 8 is comprised of an integrated circuit and includes an amplification unit (8a) and an electric leak determination unit (8b). The amplification unit (8a) amplifies the signal from the resistor 6 and the electric leak determination unit (8b) opens the switch 4 in the electric lines 2, 2 when grounding is detected based on the signal from the amplification unit (8a).

The conventional ground fault interrupter (B) shown in FIG. 4 further includes a clipping circuit and a resistor (R1) for limiting an input current to the electric leak detection circuit 8. The resistor (R1) is positioned between the zero-phase current transformer 5 and the electric leak detection circuit 8, and prevents the electric leak detection circuit 8 from being damaged by a large output generated by the zero-phase current transformer 5, for example, due to electrical surge. The clipping circuit is comprised of a pair of diodes (D1), (D2) and connected in parallel to the resistor 6.

In such a conventional ground fault interrupter, the electric leak determination unit (8b) determines that electric leak occurs when the electric leak detection circuit 8 receives a high frequency signal even though the ground fault does not actually occur. Consequently, when the load is an inverter device, the conventional ground fault interrupter (B) unnecessarily opens the switch 4.

Furthermore, to prevent such a malfunction, another conventional ground fault interrupter (C) shown in FIG. 5 includes a filter (8c) provided in an electric leak detection circuit 8'. The filter (8c) cuts high frequency elements in a signal outputted from a zero-phase current transformer 5. As in the previous conventional ground fault interrupter (B), this electric leak detection circuit 8' is comprised of an integrated circuit.

Although the filter (8c) of the ground fault interrupter (C) sufficiently cuts high frequencies, the ground fault interrupter (C) still malfunctions because of a large amount of high frequency electric leak current, thus unnecessarily opening the switch 4.

When high frequency electric leak occurs, a voltage across a resistor 6 connected to the zero-phase current transformer 5 gets clipped by a clipping circuit. Specifically, because a voltage drop of approximately 0.7 V occurs across diodes (D11), (D12), the voltage across the resistor 6 becomes a constant at 0.7 V for a duration when the output of the zero-phase current transformer 5 is large. The voltage signal during this clipping period thus has a low frequency. As a result, a current which is almost DC passes though the filter (8c) and causes the malfunction described above.

SUMMARY OF THE INVENTION

According to one aspect of the present invention, a ground fault interrupter includes a switch, a zero-phase current transformer, a detection resistor, a controller and at least one filter. The switch is provided in electric lines connecting an electric power source and an electric load. The zero-phase current transformer is configured to detect unbalanced current flowing in the electric lines. The detection resistor is connected in parallel to the zero-phase current transformer and configured to convert current outputted from the zero-phase current transformer to voltage. The controller is configured to determine based on the voltage of the detection resistor whether an electric leak occurs and to open the switch when the controller determines that an electric leak occurs. The at least one filter is provided between the detection resistor and the controller and configured to remove high frequency elements in the voltage of the resistor. The at least one filter includes an input side resistor which is connected in series to the controller and which is configured to limit current input to the controller; and a capacitor which is connected in parallel to the controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
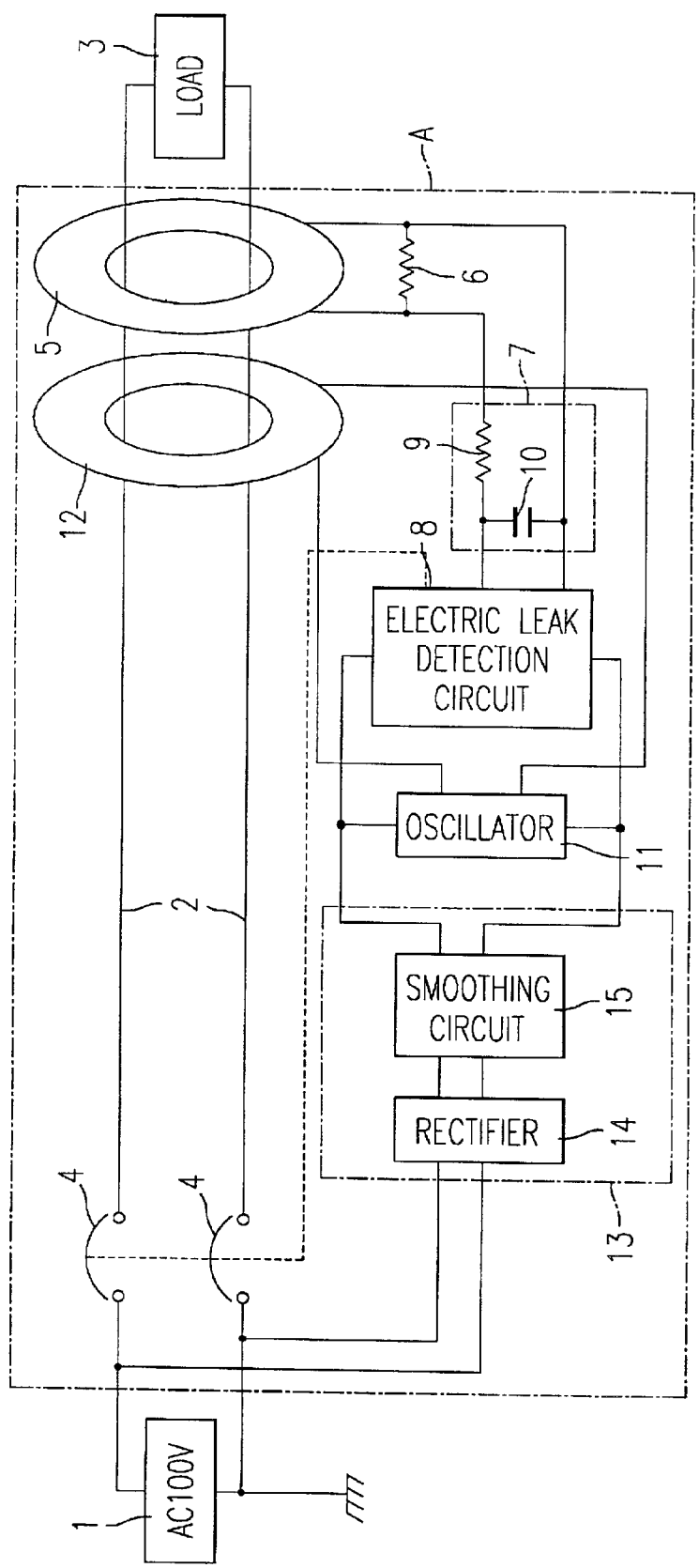
FIG. 1 is a schematic illustration of a ground fault interrupter according to one embodiment of the present invention.

The preferred embodiments will now be described with reference to the accompanying drawings, wherein like reference numerals designate corresponding or identical elements throughout the various drawings.

FIG. 1 is a schematic illustration of a ground fault interrupter according to one embodiment of the present invention. Referring to FIG. 1, the ground fault interrupter (A) according to this embodiment includes a zero-phase current transformer 5, a resistor 6 for detection and an electric leak detection circuit 8 for controlling a switch 4. A commercial electric source 1 which is grounded is connected to a load 3 through electric lines 2, 2. The zero-phase current transformer 5 detects unbalanced current flowing in the electric lines 2, 2. The resistor 6 is connected to the output of the zero-phase current transformer 5 and converts the current flowing in the zero-phase current transformer 5 to a voltage signal. An electric leak detection circuit 8 opens and closes a switch 4 provided in the electric lines 2, 2 based on the voltage signal from the resistor 6. Namely, the electric leak detection circuit 8 opens the switch 4 when the voltage of the resistor 6 is higher than a predetermined threshold value. The electric leak detection circuit 8 includes an integrated circuit and has an amplifying unit and an electric leak determination unit. The amplifying unit amplifies the voltage signal from the resistor 6, and the electric leak determination unit closes the switch 4 in the electric lines 2, 2 when an electric leak is detected based on the output signal from the amplifying unit.

Also, the ground fault interrupter (A) in this embodiment has a DC electric source 13 to supply DC voltage to the electric leak detection circuit 8. The DC electric source 13 includes a rectifier 14 and a smoothing circuit 15. The rectifier 14 rectifies current from the commercial electric source 1, and the smoothing circuit 15 smooths the output from the rectifier 14.

Figure 6:
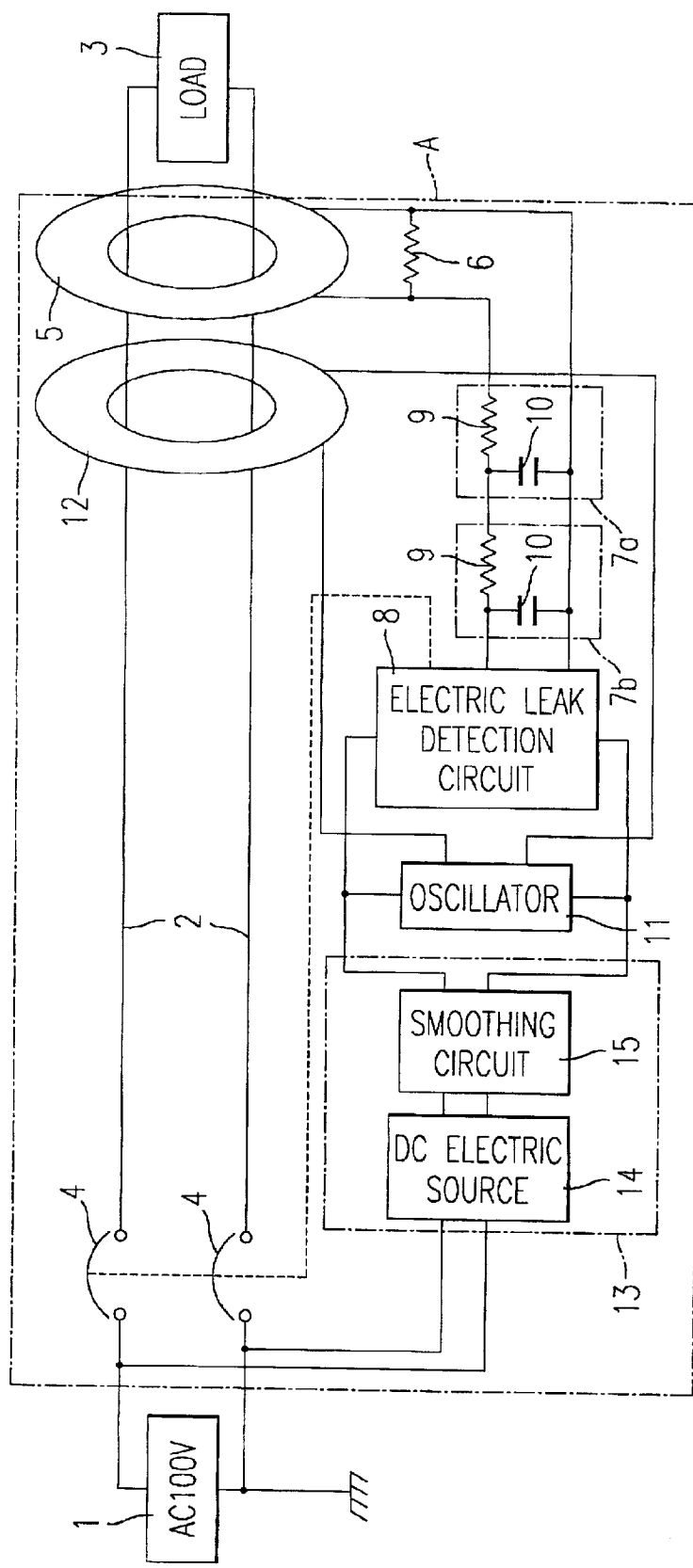
FIG. 6 is a schematic illustration of a ground fault interrupter according to another embodiment of the present invention.

Furthermore, the ground fault interrupter (A) in this embodiment has a filter 7 which is positioned between the resistor 6 and the electric leak detection circuit 8. The filter 7 removes high frequency elements in the voltage signal outputted from the resistor 6. The filter 7 includes a resistor 9 and a capacitor 10. The resistor is connected in series to the electric leak detection circuit 8. The capacitor 10 is connected in parallel to the electric leak detection circuit 8. The resister 9 is positioned between the resistor 6 and the electric leak detection circuit 8. The resistor 9 also serves as a resistance to limit input current to the electric leak detection circuit 8. The resistance value of the resistor 9 and the capacitance value of the capacitor 10 are determined such that the electric leak detection circuit 8 determines that an electric leak occurs when a ground fault actually occurs and the electric leak detection circuit 8 does not determine that an electric leak occurs when a ground fault actually does not occur. For example, the resistance value of the resistor 9 and the capacitance value of the capacitor 10 are determined such that the filter 7 cut high frequency elements higher than 200 (Hz). Namely, the filter 7 passes only elements which have frequency between 0 and 200 (Hz). In order to satisfy these conditions, for example, two CR filters (7a and 7b) may be used as shown in FIG. 6.

Also provided in the ground fault interrupter (A) of this embodiment are a current transformer 12 for detecting grounding and an oscillator 11. The electric lines 2, 2 pass through the current transformer 12. The oscillator 11 functions as an AC source for the current transformer 12 and supplies current to the current transformer 12. The current transformer 12 is being energized at all times.

Figure 4:
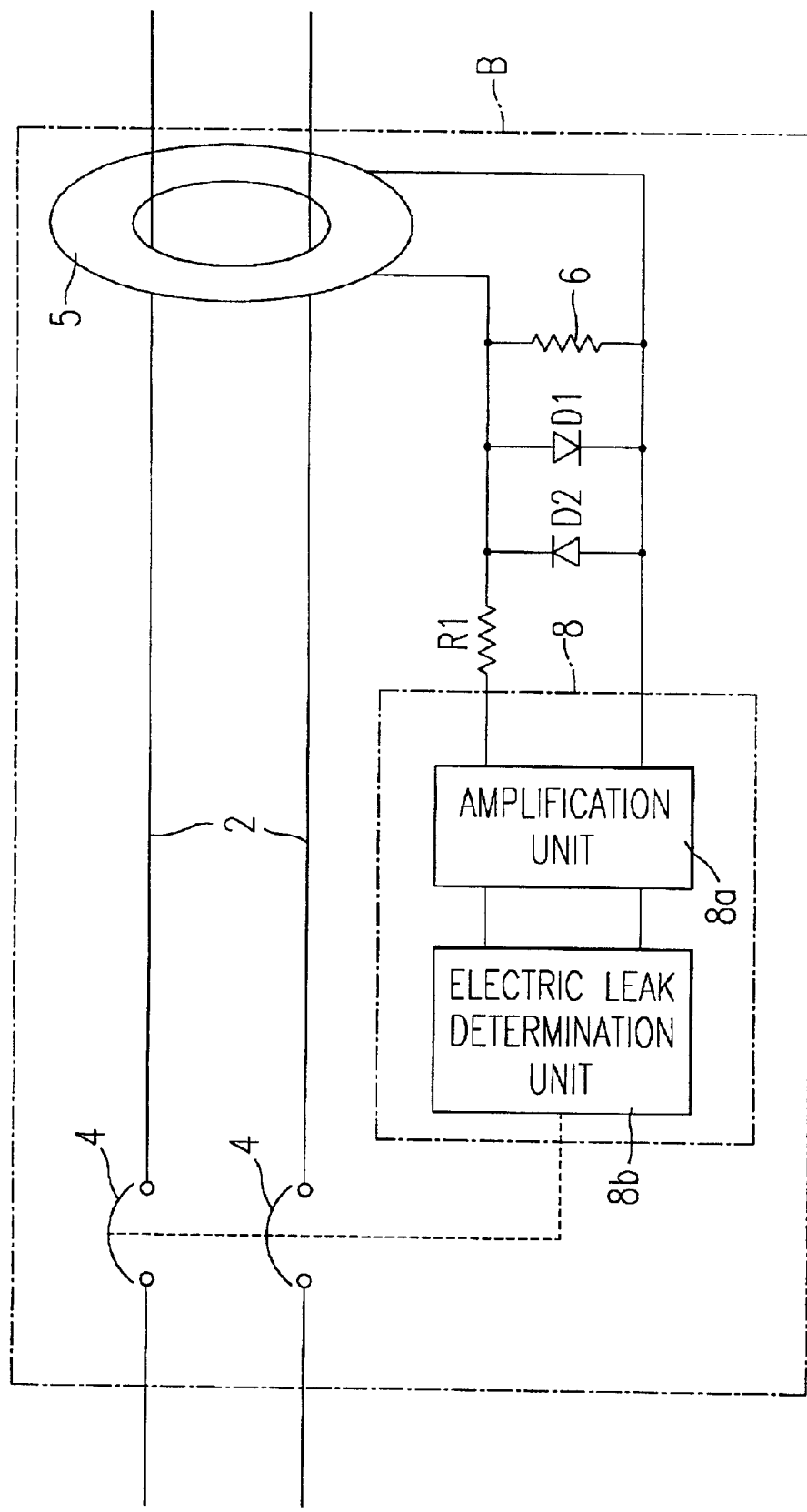
FIG. 4 is a schematic illustration of a ground fault interrupter according to a background art.
Figure 5:
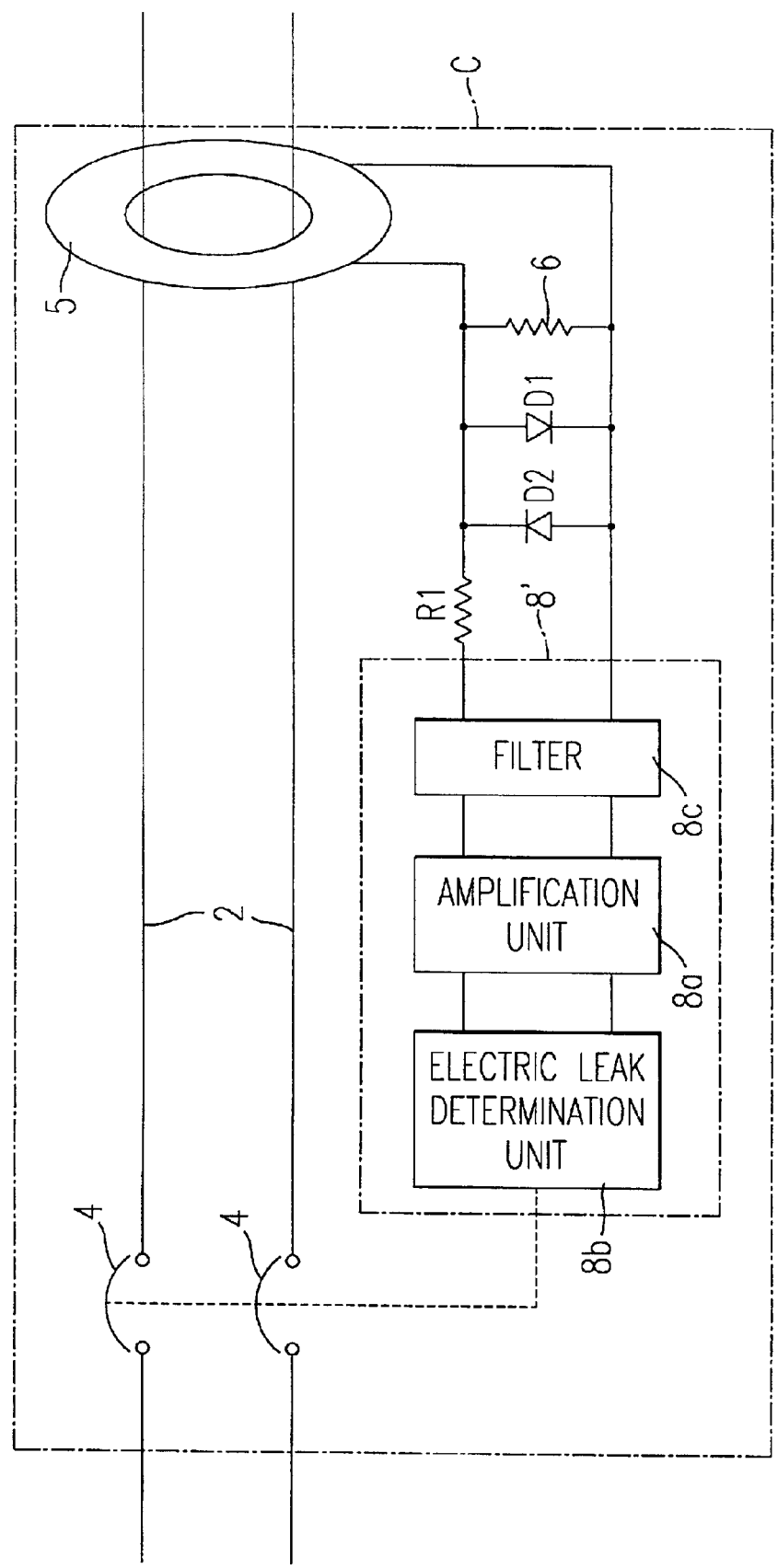
FIG. 5 is a schematic illustration of a ground fault interrupter according to another background art.

In this embodiment, the ground fault interrupter (A) has the filter 7 which removes high frequency elements in the voltage signal outputted from the resistor 6 and which sets a limit to input current flowing into the electric leak detection circuit 8. Therefore, unlike the ground fault interrupter shown in FIG. 4 as a background, the ground fault interrupter (A) according to this embodiment does not need a clipping circuit comprised of a pair of diodes (D1, D2). Furthermore, in the ground fault interrupter (A) according to this embodiment, even when high frequency electric leak of a large current occurs, a signal of low frequency elements is not generated. Thus, when the load 3 is a high capacity inverter device, the ground fault interrupter (A) according to this embodiment prevents the switch 4 from opening due to a malfunction caused by a high frequency electric leak.

Also in this embodiment, the ground fault interrupter (A) has the current transformer 12 and the oscillator 11, and the current transformer 12 is energized at all times. Hence, when grounding occurs on the neutral line of the electric lines 2, 2, a current as a secondary output of the current transformer 12 flows from a point of the incident to ground, to a grounding conductor of a transformer, and then to a neutral line. Subsequently, the zero-phase current transformer 5 detects an unbalanced current, and the switch 4 is opened as a result. As such, the ground fault interrupter (A) according to this embodiment opens the switch 4 by detecting grounding which takes place on the neutral line side of the electric lines 2, 2.

The electric leak detection circuit 8 may open the switch 4 when the voltage of the resistor 6 is higher than a predetermined reference value which is lower than the predetermined threshold value. Accordingly, the electric leak detection circuit 8 may open the switch 4 before an electric leak actually occurs.

Figure 2:
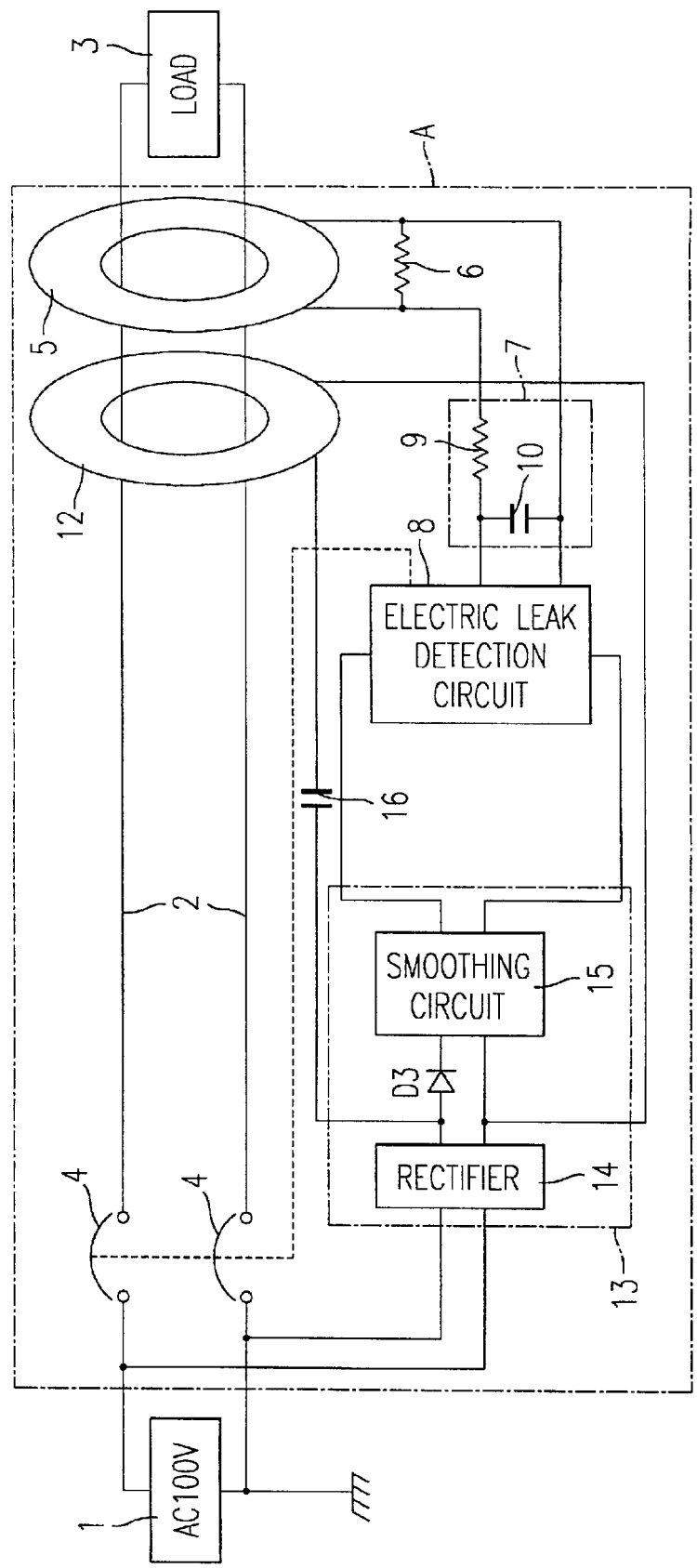
FIG. 2 is a schematic illustration of a ground fault interrupter according to another embodiment of the present invention.

FIG. 2 is a schematic illustration of a ground fault interrupter according to another embodiment of the present invention. Referring to FIG. 2, the ground fault interrupter according to this embodiment includes the current transformer 12 for detecting grounding and a diode (D3). In this embodiment, the current transformer 12 is connected between the two output lines from the rectifier 14 through a capacitor 16. The diode (D3) is connected between the smoothing circuit 15 and the rectifier 14.

The capacitor 16 limits current flowing to the current transformer 12. The inductance of the current transformer 12 and the capacitance of the capacitor 16 determines the current which flows to the current transformer 12. As a result, compared to a ground fault interrupter utilizing only a resistor to limit the energizing current to the current transformer 12, less heat is generated.

As in the previous embodiment, the ground fault interrupter (A) according to the present embodiment has the filter 7 provided separately from the electric leak detection circuit 8, and the filter 7 removes high frequency elements in the voltage signal outputted from the resistor 6 and sets a limit to input current flowing into the electric leak detection circuit 8. Therefore, unlike the ground fault interrupter shown in FIG. 4 as a background, the ground fault interrupter (A) according to this embodiment does not need a clipping circuit comprised of a pair of diodes (D1, D2). Furthermore, in the ground fault interrupter (A) according to this embodiment, even when high frequency electric leak of a large current occurs, a signal of low frequency elements is not generated. Thus, when the load 3 is a high capacity inverter device, the ground fault interrupter (A) according to this embodiment prevents the switch 4 from opening due to a malfunction caused by a high frequency electric leak.

Furthermore, in this embodiment, when grounding occurs on the neutral line side of the electric lines 2, 2, a current as a secondary output of the current transformer 12 flows from a point of the incident to ground, to a grounding conductor of a transformer, and then to a neutral line. Subsequently, the zero-phase current transformer 5 detects an unbalanced current, and the switch 4 is opened as a result. As such, the ground fault interrupter (A) according to this embodiment detects grounding which takes place on the neutral line side of the electric lines 2, 2 without the oscillator 11 separately provided in the previous embodiment.

In addition, by making the filter 7 to permit to pass signals having frequencies up to the frequency of the oscillator 11, i.e., adjusting the filter 7 to pass signals having frequencies up to the frequency of the secondary output from the current transformer 12, a frequency range for electric leak detection may be set lower, thus preventing malfunction due to high frequency electric leak more effectively.

Figure 3:
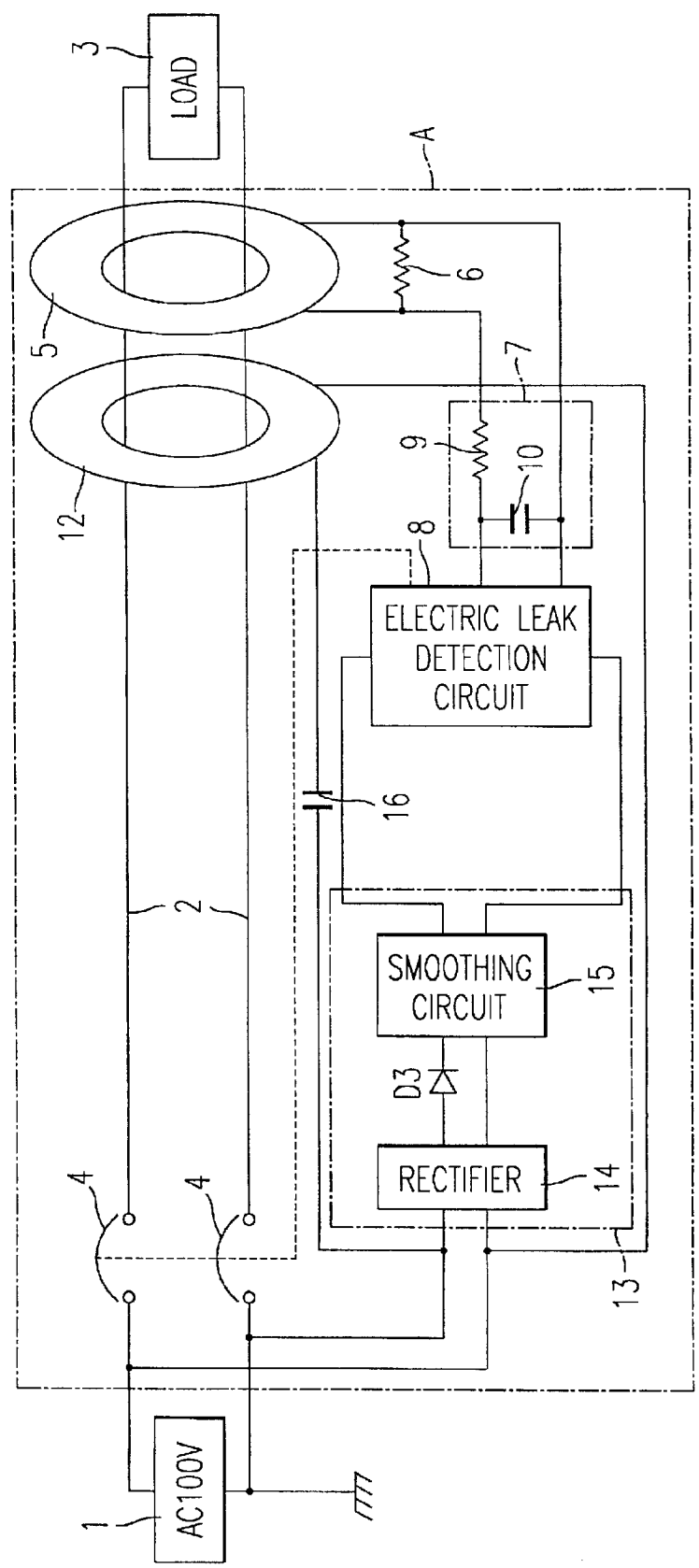
FIG. 3 is a schematic illustration of a ground fault interrupter according to yet another embodiment of the present invention.

FIG. 3 is a schematic illustration of a ground fault interrupter according to yet another embodiment of the present invention. Referring to FIG. 3, the ground fault interrupter according to this embodiment is designed such that the energizing current to the current transformer 12 is supplied from the commercial electric source 1 through the capacitor 16 and the diode (D3) is connected between the rectifier 14 and the smoothing circuit 15.

The capacitor 16 limits a energizing current to the current transformer 12 and determines the energizing current based on the inductance of the current transformer 12 and the capacitance of the capacitor 16. As a result, compared to a ground fault interrupter utilizing only a resistor to limit the energizing current to the current transformer 12, less heat is generated.

As in the previous embodiment, the ground fault interrupter (A) according to the present embodiment has the filter 7 provided separately from the electric leak detection circuit 8, and the filter 7 removes high frequency elements in the voltage signal outputted from the resistor 6 and sets a limit to input current flowing into the electric leak detection circuit 8. Therefore, unlike the ground fault interrupter shown in FIG. 4 as a background, the ground fault interrupter (A) according to this embodiment does not need a clipping circuit comprised of a pair of diodes (D1, D2). Furthermore, in the ground fault interrupter (A) according to this embodiment, even when high frequency electric leak of a large current occurs, a signal of low frequency elements is not generated. Thus, when the load 3 is a high capacity inverter device, the ground fault interrupter (A) according to this embodiment prevents the switch 4 from opening due to a malfunction caused by a high frequency electric leak.

Furthermore, in this embodiment, when grounding occurs on the neutral line side of the electric lines 2, 2, a current as a secondary output of the current transformer 12 flows from a point of the incident to ground, to a grounding conductor of a transformer, and then to a neutral line. Subsequently, the zero-phase current transformer 5 detects an unbalanced current, and the switch 4 is opened as a result. As such, the ground fault interrupter (A) according to this embodiment detects grounding which takes place on the neutral line side of the electric lines 2, 2 without the oscillator 11 separately provided in the previous embodiment.

In order for the ground fault interrupters according to the second and third embodiments to magnetize the current transformer 12 by using the commercial electric source 1 and detect grounding occurring on the neutral line side in preventing the switch 4 from being opened due to high frequency electric leak, the filter 7 is preferably set to permit frequencies up to approximately 200 Hz.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ground fault interrupter, comprising:
    a switch provided in electric lines connecting an electric power source and an electric load;
    a zero-phase current transformer configured to detect unbalanced current flowing in the electric lines;
    a detection resistor connected in parallel to the zero-phase current transformer and configured to convert current outputted from the zero-phase current transformer to voltage;
    a controller configured to determine based on the voltage of the detection resistor whether an electric leak occurs and configured to open the switch when the controller determines that an electric leak occurs;
    at least one filter provided between the detection resistor and the controller and configured to remove high frequency elements in the voltage of the resistor, the at least one filter comprising:
        an input side resistor connected in series to the controller and configured to limit current input to the controller; and
        a capacitor connected in parallel to the controller;
    an additional current transformer configured to detect grounding; and
    an alternating-current electric source configured to supply current to the additional current transformer to energize the additional current transformer, the alternating-current electric source comprising:
        a rectifier configured to rectify alternating-current; and
        an oscillator configured to generate alternating-current from the rectified alternating-current.

2. A ground fault interrupter according to claim 1, wherein a resistance value of the input side resistor and a capacitance value of the capacitor are determined such that the controller determines that an electric leak occurs when a ground fault actually occurs and that an electric leak does not occur when a ground fault actually does not occur.

3. A ground fault interrupter according to claim 1, wherein a resistance value of the input side resistor and a capacitance value of the capacitor are determined such that the filter cuts high frequency elements higher than approximately 200 (Hz).

4. A ground fault interrupter according to claim 1, wherein the controller is configured to determine that an electric leak occurs when the voltage of the detection resistor is higher than a predetermined threshold.

5. A ground fault interrupter according to claim 1, wherein the at least one filter is configured to cut current having a frequency higher than a frequency of the alternating-current electric source.

6. A ground fault interrupter according to claim 1, wherein the controller is configured to determine that an electric leak occurs when the voltage of the detection resistor is higher than a predetermined reference value which is lower than a predetermined threshold value to open the switch before an electric leak actually occurs.

7. A ground fault interrupter, comprising:
    a switch provided in electric lines connecting an electric power source and an electric load;
    a zero-phase current transformer configured to detect unbalanced current flowing in the electric lines;
    a detection resistor connected in parallel to the zero-phase current transformer and configured to convert current outputted from the zero-phase current transformer to voltage;

a controller configured to open the switch when an electric leak is detected based on the voltage of the detection resistor;

at least one filter provided between the detection resistor and the controller and configured to remove high frequency elements in the voltage of the resistor, the at least one filter comprising:
  an input side resistor connected in series to the controller and configured to
  limit current input to the controller; and
  a capacitor connected in parallel to the controller;

an additional current transformer configured to detect grounding; and an alternating-current electric source configured to supply current to the additional current transformer to energize the additional current transformer, the alternating-current electric source comprising:
  a rectifier configured to rectify alternating-current; and
  an oscillator configured to generate alternating-current from the rectified alternating-current.

8. A ground fault interrupter, comprising:

a switch provided in electric lines connecting an electric power source and an electric load;

zero-phase current transforming means for detecting unbalanced current flowing in the electric lines;

detection means for converting current outputted from the zero-phase current transforming means to voltage, the detection means being connected in parallel to the zero-phase current transforming means;

controlling means for determining based on the voltage of the detection means whether an electric leak occurs and for opening the switch when the controlling means determines that an electric leak occurs;

at least one filter means for removing high frequency elements in the voltage of the detection means and provided between the detection means and the controlling means, the at least one filter means comprising:
  an input side resistor connected in series to the controlling means and
  configured to limit current input to the controlling means; and
  a capacitor connected in parallel to the controlling means;

additional current transforming means for detecting grounding; and alternating-current supply means for supplying current to the additional current transforming means to energize the additional current transforming means, the alternating-current supply means comprising:
  rectifying means for rectifying alternating-current; and
  oscillation means for generating alternating-current from the rectified alternating-current.

* * * * *